(12) United States Patent
Manson

(10) Patent No.: US 11,755,431 B2
(45) Date of Patent: Sep. 12, 2023

(54) IDENTIFICATION OF OPTIMAL BIT APPORTIONMENTS FOR DIGITAL FUNCTIONS SUBJECT TO SOFT ERRORS

(71) Applicant: Raytheon Company, Waltham, MA (US)

(72) Inventor: Steven J. Manson, Tucson, AZ (US)

(73) Assignee: Rattheon Company, Waltham, MA (US)

( * ) Notice: Subject to any disclaimer, the term of this patent is extended or adjusted under 35 U.S.C. 154(b) by 191 days.

(21) Appl. No.: 17/464,938

(22) Filed: Sep. 2, 2021

(65) Prior Publication Data

US 2023/0205651 A1    Jun. 29, 2023

(51) Int. Cl.
  *G06F 11/18* (2006.01)
  *G06F 11/16* (2006.01)
  *G06F 11/14* (2006.01)

(52) U.S. Cl.
  CPC ........ *G06F 11/167* (2013.01); *G06F 11/1471* (2013.01); *G06F 11/187* (2013.01); *G06F 2201/82* (2013.01)

(58) Field of Classification Search
  CPC ... G06F 11/167; G06F 11/1471; G06F 11/187
  USPC .......................................................... 714/42
  See application file for complete search history.

(56) References Cited

U.S. PATENT DOCUMENTS

| | | | |
|---|---|---|---|
| 6,812,731 B1 | 11/2004 | Trimberger | |
| 11,099,748 B1 | 8/2021 | Fraction et al. | |
| 2012/0136657 A1* | 5/2012 | Shirakawa | G10L 19/035 704/229 |
| 2014/0189417 A1 | 7/2014 | Hum et al. | |
| 2015/0169400 A1 | 6/2015 | Morris et al. | |
| 2020/0007624 A1* | 1/2020 | Biswas | H04L 47/70 |
| 2020/0034230 A1 | 1/2020 | Jeyapaul et al. | |
| 2020/0151067 A1 | 5/2020 | Golov | |
| 2021/0141699 A1* | 5/2021 | Golov | G06F 11/1004 |

OTHER PUBLICATIONS

Xilinx, "MicroBlaze Triple Modular Redundancy (TMR) Subsystem v1.0," Product Guide, Vivado Design Suite, Nov. 2019, 97 pages.

(Continued)

*Primary Examiner* — Chae M Ko

(57) ABSTRACT

A method includes identifying multiple apportionments, where each apportionment identifies numbers of bit copies to be stored in at least one memory for at least some bits of a data value. The method also includes, for each apportionment, estimating a numerical error associated with use of the apportionment with a specified function, where the numerical error is estimated by creating errors in bit copies of multiple data values processed using the specified function. The method further includes combining portions of different ones of the apportionments having lower estimated numerical errors to create multiple derived apportionments. The method also includes, for each derived apportionment, estimating a numerical error associated with use of the derived apportionment with the specified function. In addition, the method includes selecting a final apportionment for use with the specified function, where the final apportionment includes or is based on at least one of the derived apportionments.

20 Claims, 7 Drawing Sheets

(56) References Cited

OTHER PUBLICATIONS

Wikipedia, "Triple modular redundancy," Jun. 2021, 8 pages.
Manson, "Optimal Bit Apportionments for Digital Functions Subject to Soft Errors," U.S. Appl. No. 17/464,827, filed Sep. 2, 2021, 43 pages.
International Search Report and Written Opinion of the International Searching Authority dated Oct. 6, 2022 in connection with International Patent Application No. PCT/US2022/033661, 11 pages.
Non-Final Office Action dated Aug. 4, 2022 in connection with United States U.S. Appl. No. 17/464,827, 15 pages.
Albandes et al., "Improving Approximate-TMR using Multi-Objective Optimization Genetic Algorithm," IEEE, 2018, 6 pages.
Arifeen et al., "Approximate Triple Modular Redundancy: A Survey," IEEE Access, vol. 8, Jul. 2020, 17 pages.

* cited by examiner

IDENTIFICATION OF OPTIMAL BIT APPORTIONMENTS FOR DIGITAL FUNCTIONS SUBJECT TO SOFT ERRORS

TECHNICAL FIELD

This disclosure is generally directed to computing systems. More specifically, this disclosure is directed to the identification of optimal bit apportionments for digital functions subject to soft errors.

BACKGROUND

Various types of systems can be subjected to nuclear radiation during use, such as satellites or other vehicles in space. In these and other types of systems, nuclear radiation can cause soft errors in data during storage or processing. In some approaches, these soft errors are handled by keeping multiple copies of each data bit and using a voting scheme to estimate the "correct" value of each data bit based on the multiple copies. For example, a "triple modular redundancy" or "TMR" approach may maintain three copies of each data bit, and a voting scheme can be used to determine each data bit's value based on the three copies of that data bit.

SUMMARY

This disclosure relates to the identification of optimal bit apportionments for digital functions subject to soft errors.

In a first embodiment, a method includes identifying multiple apportionments, where each apportionment identifies numbers of bit copies to be stored in at least one memory for at least some bits of a data value. The method also includes, for each of the apportionments, estimating a numerical error associated with use of the apportionment with a specified function, where the numerical error is estimated by creating errors in bit copies of multiple data values processed using the specified function. The method further includes combining portions of different ones of the apportionments having lower estimated numerical errors to create multiple derived apportionments. The method also includes, for each of the derived apportionments, estimating a numerical error associated with use of the derived apportionment with the specified function. In addition, the method includes selecting a final apportionment for use with the specified function, where the final apportionment includes or is based on at least one of the derived apportionments.

In a second embodiment, an apparatus includes at least one processing device configured to identify multiple apportionments, where each apportionment identifies numbers of bit copies to be stored in at least one memory for at least some bits of a data value. The at least one processing device is also configured, for each of the apportionments, to estimate a numerical error associated with use of the apportionment with a specified function, where the numerical error is based on errors created in bit copies of multiple data values processed using the specified function. The at least one processing device is further configured to combine portions of different ones of the apportionments having lower estimated numerical errors to create multiple derived apportionments. The at least one processing device is also configured, for each of the derived apportionments, to estimate a numerical error associated with use of the derived apportionment with the specified function. In addition, the at least one processing device is configured to select a final apportionment for use with the specified function, where the final apportionment includes or is based on at least one of the derived apportionments.

In a third embodiment, a non-transitory computer readable medium contains instructions that when executed cause at least one processor to identify multiple apportionments, where each apportionment identifies numbers of bit copies to be stored in at least one memory for at least some bits of a data value. The medium also contains instructions that when executed cause the at least one processor, for each of the apportionments, to estimate a numerical error associated with use of the apportionment with a specified function, where the numerical error is based on errors created in bit copies of multiple data values processed using the specified function. The medium further contains instructions that when executed cause the at least one processor to combine portions of different ones of the apportionments having lower estimated numerical errors to create multiple derived apportionments. The medium also contains instructions that when executed cause the at least one processor, for each of the derived apportionments, to estimate a numerical error associated with use of the derived apportionment with the specified function. In addition, the medium contains instructions that when executed cause the at least one processor to select a final apportionment for use with the specified function, where the final apportionment includes or is based on at least one of the derived apportionments.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1A:
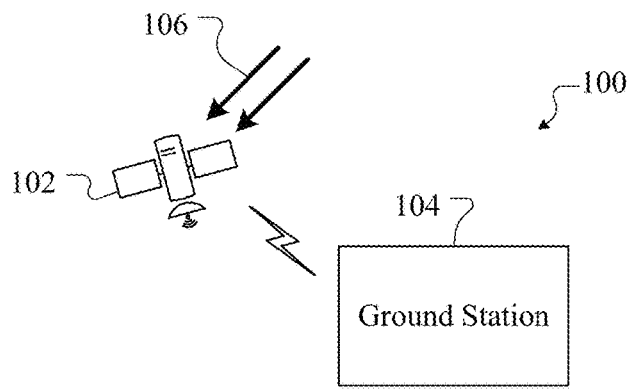
FIGS. 1A through 1C illustrate an example system susceptible to soft errors and example causes of soft errors according to this disclosure.

FIGS. 1 through 8, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, various types of systems can be subjected to nuclear radiation during use, such as satellites or other vehicles in space. In these and other types of systems, nuclear radiation can cause soft errors in data during storage or processing. In some approaches, these soft errors are handled by keeping multiple copies of each data bit and using a voting scheme to estimate the "correct" value of each data bit based on the multiple copies. For example, a "triple modular redundancy" or "TMR" approach may maintain three copies of each data bit, and a voting scheme can be used to determine each data bit's value based on the three copies of that data bit.

Unfortunately, in very noisy environments, multiple copies of the same data bit may suffer from errors at or near the same time, and the TMR approach is generally unable to handle multi-bit errors. While more copies of data bits may be used (such as by using quintuple modular redundancy or septuple modular redundancy), this requires a larger amount of resources like memory resources in an overall system. Error detection and correction (EDAC) approaches can be used to insert additional error-correcting information into data for use in detecting and correcting errors, but these approaches can still have difficulty handling multi-bit errors.

This disclosure provides techniques for identifying improved or optimal apportionments of the number of copies to be maintained for different data bits in data values and devices or systems that use those apportionments. As described in more detail below, these techniques can begin with random or other apportionments of the number of bit copies to be maintained in a specific application. Each apportionment identifies the number of copies to be maintained for each data bit of a data value, and different apportionments can identify different numbers of copies to be maintained for at least some of the data bits. For example, one apportionment might indicate that three copies of the most significant bit and one copy of the least significant bit should be used, and another apportionment might indicate that two copies of the most significant bit and two copies of the least significant bit should be used.

Simulations are performed to calculate the cumulative numerical error that is induced at the desired bit error rate if each apportionment is used in the specific application, and the apportionments with better performance (lower cumulative numerical errors) can be identified. A genetic algorithm is used to "breed" or combine portions of the identified apportionments with the better performance in order to generate novel derived apportionments, and the cumulative numerical errors associated with the derived apportionments can be identified using the simulations. In some cases, the simulations performed for the derived apportionments are the same simulations performed for the original apportionments. If desired, the derived apportionments can be bred or combined again to produce additional derived apportionments, which can be processed in the same or similar manner. This process can repeat until at least one derived apportionment obtains a desired cumulative numerical error, a specified number of iterations have occurred, or some other criterion or criteria are met. A final apportionment may be selected, such as by selecting the derived apportionment having the best performance (lowest cumulative numerical error). The final apportionment may then be used in the specific application, such as by having a satellite or other device or system use the specified number of copies for each data bit in one or more data values.

The simulations that are performed as part of these techniques can support a number of features. For example, the simulations may consider the characteristics of a specific application, such as an application that has one or more specific amounts of memory or memories available, one or more specific types of memory or memories available, one or more specific processors available for use, one or more specific types of processor(s) available for use, a specific target cumulative numerical error to be achieved, or a specific amount of bit errors that might be introduced by radiation in a given environment. Also, the simulations may consider a specific mathematical operation to be performed using data values, since different mathematical operations may be subject to different amounts of numerical errors. Further, the simulations may involve the simulation of both single-bit errors and multi-bit errors in the copies of data bits. Moreover, the simulations may consider the use of one or both of radiation-hardened memory and/or non-radiation-hardened memory. In addition, the simulations may involve both stochastic and deterministic features for inducing the bit errors and/or measuring the cumulative numerical errors associated with different apportionments.

In this way, it is possible to identify improved or optimal apportionments of the number of copies to be used for different data bits in data values. The improved or optimal apportionments may help to provide improved or minimized cumulative numerical errors while preserving the mathematical operations being performed using the data values. Moreover, in some cases, this can be accomplished using the same total number of data bits as in a standard approach. As a particular example, since TMR uses three copies of each data bit, a 32-bit data value would use ninety-six total bits for storage of the three redundant copies. The approaches described below can be used to identify an improved or optimal allocation of the 32-bit data value within the ninety-six total bits available. Thus, these approaches can be used with the same or similar resources as other approaches (although the use of greater or smaller amounts of resources is possible in some implementations).

Figure 1B:
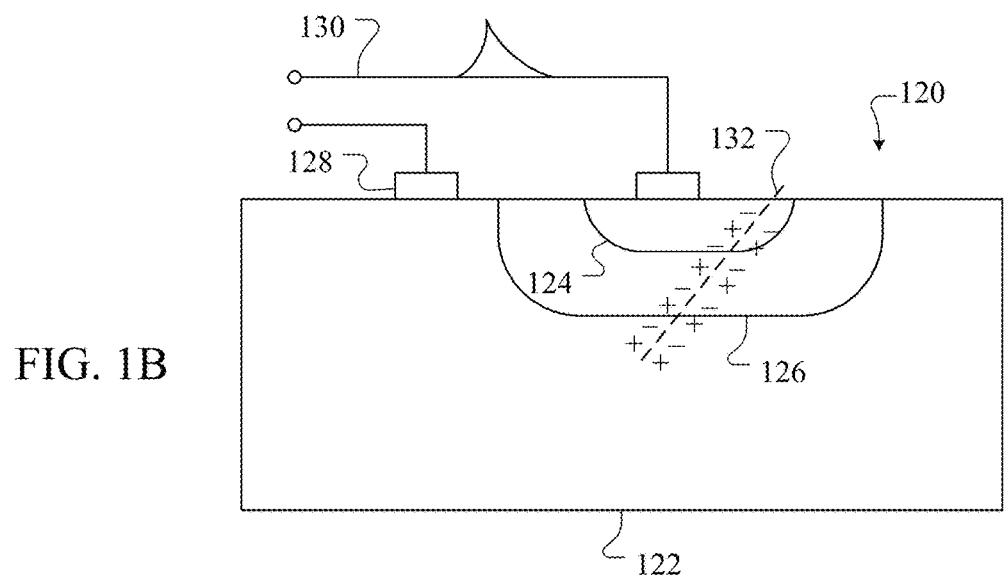
Figure 1C:
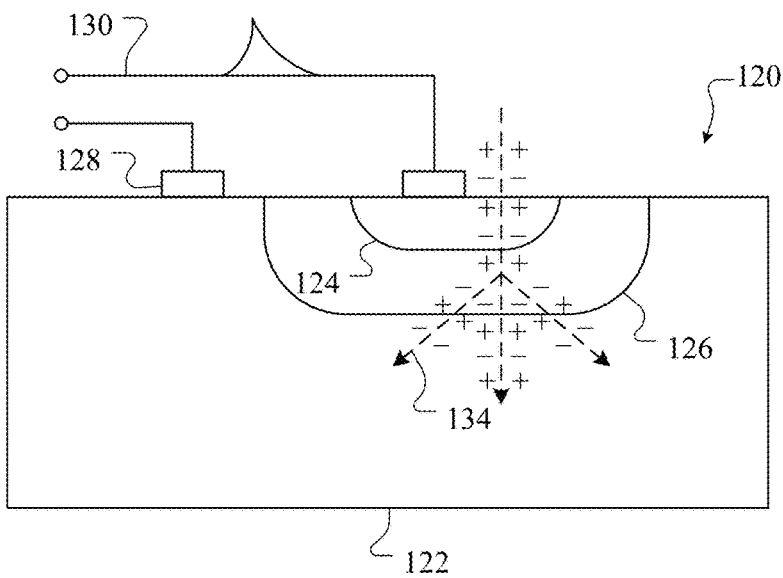

FIGS. 1A through 1C illustrate an example system 100 susceptible to soft errors and example causes of soft errors according to this disclosure. As shown in FIG. 1A, the system 100 includes a satellite 102 that is configured to communicate with a ground station 104. The satellite 102 may be used for any suitable purpose(s), such as to support communications, data collection, or threat identification. The satellite 102 typically includes one or more internal memories that are used to store information on a temporary or permanent basis. The stored information may include instructions to be executed by one or more processors of the satellite 102, data (such as integers, fixed-point numbers, and floating-point numbers) used or generated by the satellite 102, and memory addresses of memory locations within the satellite 102.

Radiation 106 strikes the satellite 102 when the satellite 102 is in orbit or otherwise in use in space. The radiation 106 may represent any type of nuclear radiation, such as ionizing radiation like fast charged particles and energetic protons. This radiation 106 can cause data bits stored in the satellite 102 to change. For example, the radiation 106 may cause a transistor storing a data bit of "zero" to toggle to a "one" (or vice versa). FIGS. 1B and 1C illustrate two possible ways in which the radiation 106 can affect information stored in the satellite 102.

As shown in FIG. 1B, a portion of a transistor 120 is shown. The transistor 120 may be used to store a data bit of a data value in the satellite 102 or other device or system. Here, the transistor 120 includes a substrate 122 and a doped region 124 of the substrate 122, where a depletion region 126 separates the doped region 124 from other portions of the substrate 122. Terminals 128 can be used to form electrical connections between different regions of the transistor 120 and signal lines 130. Here, a fast charged particle may pass through the transistor 120 and form an ionizing column 132 through the transistor 120, which may alter the state of the transistor 120 and toggle the data bit value stored by the transistor 120. Similarly, as shown in FIG. 1C, an energic proton may pass through the transistor 120 and create nuclear interactions 134 within the transistor 120, which again may alter the state of the transistor 120 and toggle the data bit value stored by the transistor 120.

It is not uncommon for radiation 106 to affect the information stored in the satellite 102. For example, while energetic ions are a normal part of the space environment, they can be up to one million times more likely during a coronal mass ejection, which refers to a significant release of plasma from the sun. Thus, data bits of the data values stored in the satellite 102 may have multiple redundant copies, and a voting scheme can be used to determine the value of each data bit based on that data bit's redundant copies. As explained in more detail below, the apportionment of the number of copies per data bit can be optimized using simulations and a genetic algorithm. Ideally, the apportionment identified using the simulations and the genetic algorithm achieve an improved or minimized cumulative numerical error when used in the satellite 102 or other device or system.

Although FIGS. 1A through 1C illustrate one example of a system 100 susceptible to soft errors and examples of causes of soft errors, various changes may be made to FIGS. 1A through 1C. For example, while FIG. 1A shows the use of a satellite 102 affected by radiation 106, the techniques and bit apportionments described in this patent document may be used with other types of space vehicles or with other devices or systems that are affected by radiation. As a particular example, since transistors and other electronics continue to shrink in size and are therefore becoming more susceptible to soft errors caused by radiation, the techniques and bit apportionments described in this patent document may be used in various applications like commercial aviation, automotive, and commercial high-reliability consumer electronics applications. Also, transistors can come in a wide variety of designs, and FIGS. 1B and 1C are not meant to limit this disclosure to any particular type of transistor.

Figure 2:
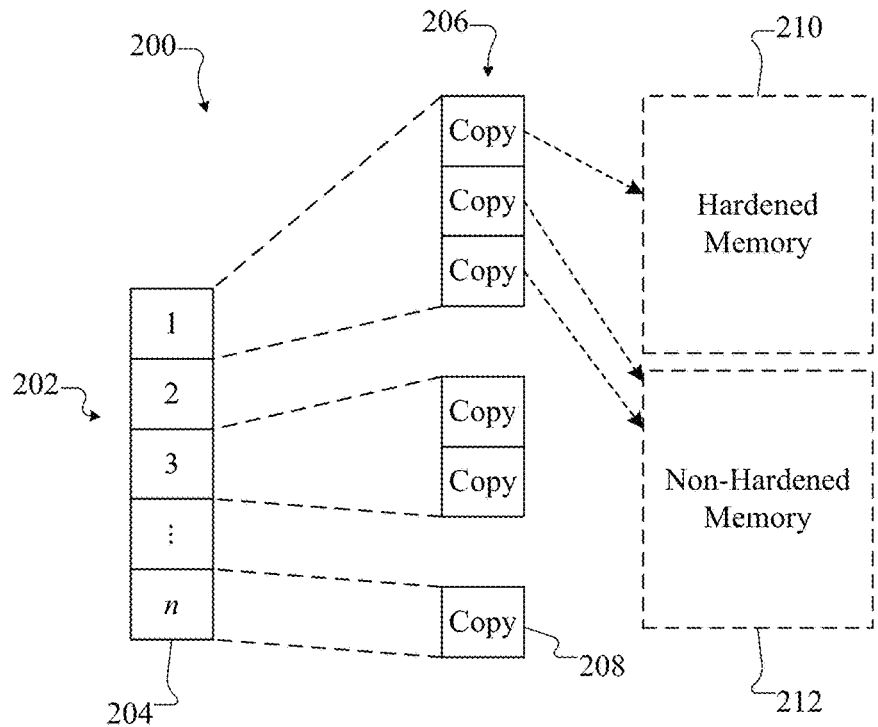
FIG. 2 illustrates an example memory design for handling soft errors according to this disclosure.

FIG. 2 illustrates an example memory design 200 for handling soft errors according to this disclosure. For ease of explanation, the memory design 200 may be described as being used in the satellite 102 within the system 100 of FIG. 1A. However, the memory design 200 may be used in any other suitable device and in any other suitable system.

As shown in FIG. 2, a data value 202 is defined by a collection of n individual data bits 204 (where n is an integer that is greater than or equal to two). The data value 202 may have any suitable number of data bits 204. In the following discussion, it may be assumed that the data value 202 represents a 32-bit value, although data values of other bit lengths may be used depending on the application.

An apportionment 206 identifies the number of bit copies 208 to be maintained in the satellite 102 for each data bit 204 of the data value 202. In this example, the apportionment 206 indicates that three bit copies 208 are maintained for the first data bit 204, two bit copies 208 are maintained for the third data bit 204, and one bit copy 208 is maintained for the $n^{th}$ data bit 204. While not shown here, the other data bits 204 of the data value 202 may have any suitable number of bit copies 208. In some embodiments, the total number of bit copies 208 for all data bits 204 may be less than or equal to 3n, meaning three times the total number of data bits 204. This allows the apportionment 206 to be implemented using the same or similar quantity of memory resources that are used for the TMR approach.

Note here that different apportionments 206 can identify different numbers of bit copies 208 to be maintained for at least some of the data bits 204 in the data value 202. Thus, for example, another apportionment 206 may indicate that some data bits 204 should have five bit copies 208 each, other data bits 204 should have one bit copy 208 each, and still other data bits 204 should have no bit copies 208 each (meaning those bits are excluded from further use). Given the wide range of possible apportionments 206 for a given data value 202, it is extremely difficult to identify an improved or optimal apportionment 206 that provides a desired bit error rate in a given application.

The approaches described below can therefore be used to identify an improved or optimal apportionment 206 of the bit copies 208 for use in a given application. For example, simulations can be performed using different apportionments 206, and cumulative numerical errors associated with the apportionments 206 can be determined during the simulations. A genetic algorithm can be used to combine portions of different apportionments 206 that have lower cumulative numerical errors to generate additional apportionments (referred to as "derived apportionments"). As a particular example, the genetic algorithm may combine one portion of one apportionment 206 defined by a cut point with one portion of another apportionment 206 defined by the same cut point. The resulting derived apportionments 206 can be subjected to the same or similar simulations in order to determine their cumulative numerical errors. Ideally, this process can continue until an improved or optimal apportionment 206 is identified for use, such as when the identified apportionment 206 achieves an adequate-low cumulative numerical error.

In some embodiments, it may be possible for the bit copies 208 to be stored in different types of memory within a satellite 102 or other device or system. For example, as shown in the example of FIG. 2, different bit copies 208 may be stored in a radiation-hardened memory 210 and a non-radiation-hardened memory 212. The radiation-hardened memory 210 may represent a complementary metal oxide semiconductor (CMOS) device or other device that is designed to be resistant to radiation in space or other environments. The non-radiation-hardened memory 212 may represent a CMOS device or other device that is not designed to be resistant to radiation. In some cases, the radiation-hardened memory 210 may still suffer from bit value changes due to radiation but at a much lower rate relative to the non-radiation-hardened memory 212.

If the bit copies 208 can be stored in multiple types of memories 210 and 212, an apportionment 206 may identify the memory 210 or 212 in which each bit copy 208 is stored. In this example, one bit copy 208 for the first data bit 204 is shown as being stored in the radiation-hardened memory 210, and two bit copies 208 for the first data bit 204 is shown as being stored in the non-radiation-hardened memory 212. However, this is for illustration only, and any number of bit copies may be stored in each type of memory (although often times multiple copies of the same bit in a radiation-hardened memory 210 may be unnecessary). Among other things, the storage of bit copies 208 in the radiation-hardened memory 210 may allow more importance to be given to those bit copies 208 in the event that different bit copies 208 of the same data bit 204 differ. For example, in a voting scheme used to select the value to be assigned to a data bit 204 based on its bit copies 208, the bit copy or copies 208 stored in the radiation-hardened memory 210 may be given more weight than the bit copy or copies 208 stored in the non-radiation-hardened memory 212, or the bit copy or copies 208 stored in the radiation-hardened memory 210 may be used to break any voting ties in the voting scheme. Thus, in some embodiments, different apportionments 206 may be created and analyzed to identify an improved or optimal apportionment, where the different apportionments 206 include different assignments of the bit copies 208 to the radiation-hardened memory 210 and the non-radiation-hardened memory 212.

Moreover, some mathematical operations performed in a satellite 102 or other device or system using data values 202 may generate intermediate results that can be stored in the radiation-hardened memory 210. For example, an accumulation operation may generally involve keeping a running total of data values 202 by setting an accumulation value to zero and adding each data value 202 to the current accumulation value. It is possible to store the current accumulation value in the radiation-hardened memory 210 (or to add the current accumulation value to a previously-stored accumulation value in the radiation-hardened memory 210) and then reset the accumulation value to zero. This may occur periodically or other times. Thus, in some embodiments, the simulations performed for identified apportionments 206 may generate cumulative numerical errors for the apportionments 206 under different usage scenarios for the radiation-hardened memory 210 and the non-radiation-hardened memory 212, such as one scenario where intermediate accumulation values are stored in the radiation-hardened memory 210 and another scenario where intermediate accumulation values are not stored in the radiation-hardened memory 210. Note, however, that the different types of memory may be used in any other suitable manner.

Although FIG. 2 illustrates one example of a memory design 200 for handling soft errors, various changes may be made to FIG. 2. For example, the memory design 200 may include any suitable number of data values 202, each data value 202 may include any suitable number of data bits 204, and the data values 202 may or may not have equal numbers of data bits 204. Also, each data value 202 may have any suitable apportionment 206 with any suitable number of bit copies 208 per data bit 204, and different data values 202 may or may not have different apportionments 206.

Figure 3:
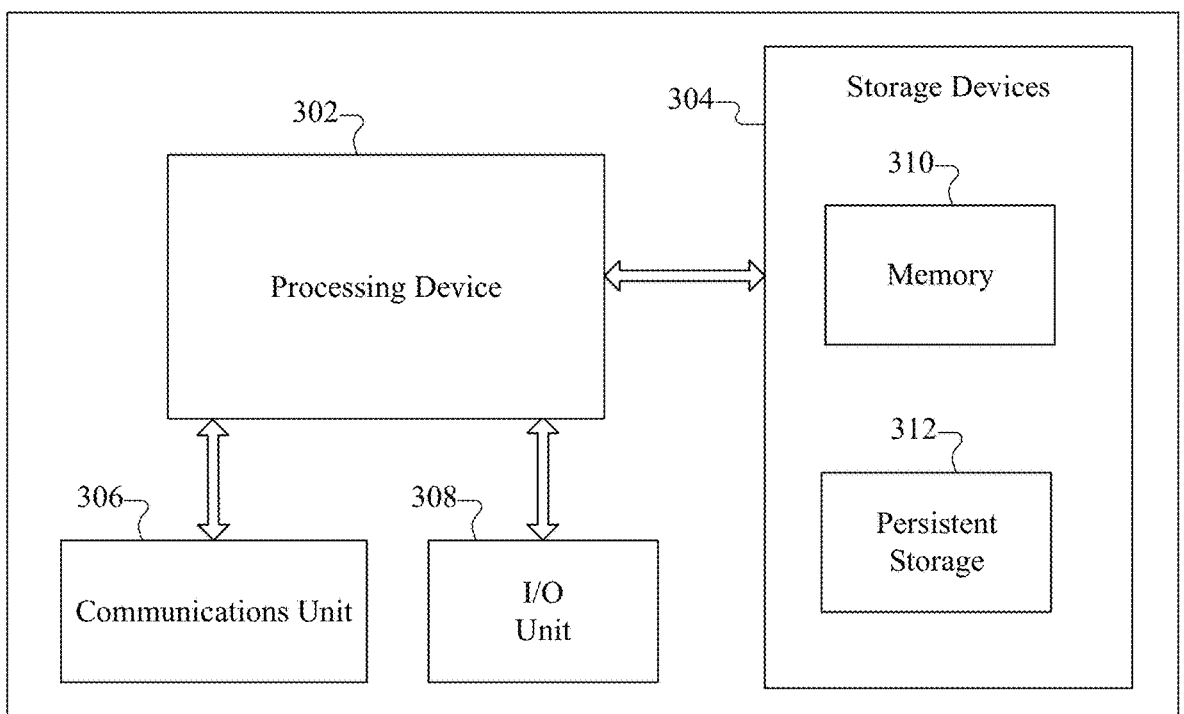
FIG. 3 illustrates an example device supporting identification of optimal bit apportionments for digital functions subject to soft errors according to this disclosure.

FIG. 3 illustrates an example device 300 supporting identification of optimal bit apportionments for digital functions subject to soft errors according to this disclosure. The device 300 may, for example, be used to perform the process described below for identifying the apportionment 206 to be used in a satellite 102 or other device or system.

As shown in FIG. 3, the device 300 denotes a computing device or system that includes at least one processing device 302, at least one storage device 304, at least one communications unit 306, and at least one input/output (I/O) unit 308. The processing device 302 may execute instructions that can be loaded into a memory 310. The processing device 302 includes any suitable number(s) and type(s) of processors or other processing devices in any suitable arrangement. Example types of processing devices 302 include one or more microprocessors, microcontrollers, digital signal processors (DSPs), application specific integrated circuits (ASICs), field programmable gate arrays (FPGAs), or discrete circuitry.

The memory 310 and a persistent storage 312 are examples of storage devices 304, which represent any structure(s) capable of storing and facilitating retrieval of information (such as data, program code, and/or other suitable information on a temporary or permanent basis). The memory 310 may represent a random access memory or any other suitable volatile or non-volatile storage device(s). The persistent storage 312 may contain one or more components or devices supporting longer-term storage of data, such as a read only memory, hard drive, Flash memory, or optical disc.

The communications unit 306 supports communications with other systems or devices. For example, the communications unit 306 can include a network interface card or a wireless transceiver facilitating communications over a wired or wireless network. The communications unit 306 may support communications through any suitable physical or wireless communication link(s). Note, however, that the communications unit 306 may be omitted if the device 300 does not require network or other external communication.

The I/O unit 308 allows for input and output of data. For example, the I/O unit 308 may provide a connection for user input through a keyboard, mouse, keypad, touchscreen, or other suitable input device. The I/O unit 308 may also send output to a display or other suitable output device. Note, however, that the I/O unit 308 may be omitted if the device 300 does not require local I/O, such as when the device 300 represents a server or other device that can be accessed remotely.

In some embodiments, the instructions executed by the processing device 302 include instructions that perform simulations and implement a genetic algorithm in order to identify a suitable apportionment 206 for a satellite 102 or other device or system. Details of example simulations and an example genetic algorithm are provided below.

Note that, in some embodiments, the satellite 102 or other device or system that implements or uses at least one bit apportionment may include various components shown in FIG. 3. For example, the satellite 102 or other device or system can include at least one processing device 302 that may execute instructions causing the processing device(s) 302 to store different numbers of bit copies 208 for bits 204 of data values 202 in at least one storage device 304. The at least one processing device 302 may also execute instructions causing the processing device(s) 302 to retrieve the bit copies 208 for a data value 202, determine if redundant bit copies 208 for the data value 202 agree, and use a voting scheme or other mechanism to estimate the correct value of at least one bit 204 when the bit copies 208 for the bit(s) 204 differ.

Although FIG. 3 illustrates one example of a device 300 supporting identification of optimal bit apportionments for digital functions subject to soft errors, various changes may be made to FIG. 3. For example, computing devices and systems come in a wide variety of configurations, and FIG. 3 does not limit this disclosure to any particular computing device or system.

Figure 4:
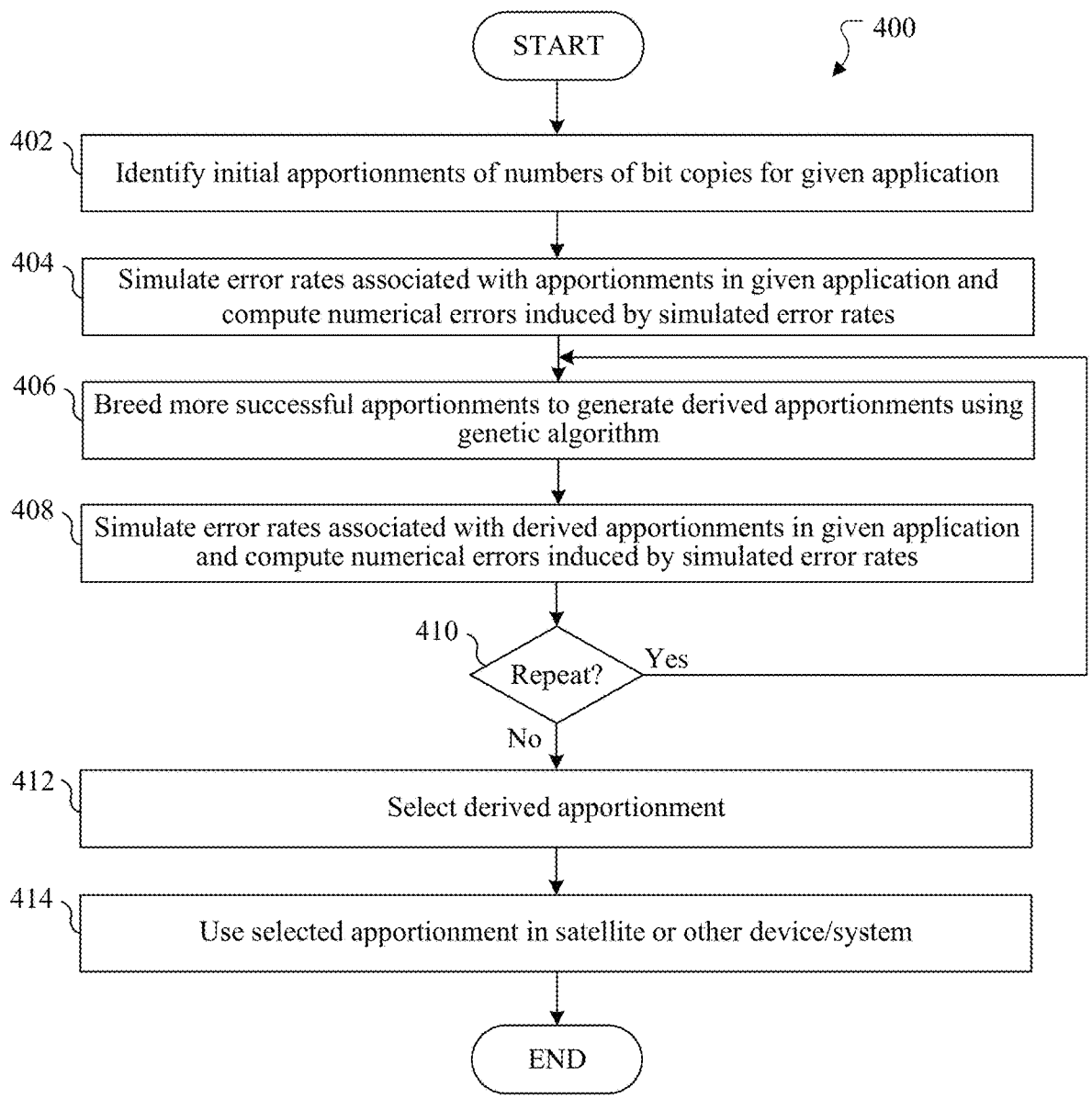
FIG. 4 illustrates an example method for identifying optimal bit apportionments for digital functions subject to soft errors according to this disclosure.

FIG. 4 illustrates an example method 400 for identifying optimal bit apportionments for digital functions subject to soft errors according to this disclosure. For ease of explanation, the method 400 may be described as being performed by the device 300 of FIG. 3 to identify an apportionment 206 to be used for data values 202 in the satellite 102 of FIG. 1A. However, the method 400 may be performed using any other suitable device, and the method 400 may be used to identify apportionments for data values in any other suitable device or system.

As shown in FIG. 4, multiple initial apportionments involving the numbers of bit copies for bits of data values in a given application are identified at step 402. This may include, for example, the processing device 302 identifying different initial apportionments 206 for the given application. In some embodiments, the initial apportionments 206 may be generated randomly, predetermined, or obtained in any other suitable manner. Also, in some embodiments, each of the initial apportionments 206 may identify up to a specified total number of bit copies 208 to be used. As a particular example, when dealing with 32-bit data values 202, each initial apportionment 206 may identify, in total, up to ninety-six bit copies 208 to be used for all thirty-two data bits 204 of a data value 202. Depending on the implementation, each initial apportionment 206 may or may not identify less than the specified total number of bit copies 208. Also, depending on the implementation, each initial apportionment 206 may or may not use different types of memory (such as radiation-hardened and non-radiation-hardened memory) for storing different bit copies 208.

Simulations are performed to estimate error rates that might be obtained when using the multiple initial apportionments in the given application and to identify the cumulative numerical errors induced by the simulated error rates at step 404. This may include, for example, the processing device 302 performing simulations that estimate the error rate resulting from usage of each of the initial apportionments 206 with a given set of data values 202, where random errors are introduced into various bit copies 208 of the data values 202 during the simulations. In some embodiments, for example, the data values 202 with the random errors in their bit copies 208 are used in a mathematical operation to be performed by a satellite 102 or other device or system, and errors in the results produced by the mathematical operation (caused by the random errors in the bit copies 208) are estimated as the cumulative numerical errors. Note that not all errors introduced into the bit copies 208 of the data values 202 may result in errors in the output of the mathematical operation, since some of the errors can be corrected using the redundant bit copies 208 and the voting scheme. Thus, different initial apportionments 206 can have different performances (different cumulative numerical errors) depending on whether the different initial apportionments 206 do or do not allow the random bit errors to propagate into the mathematical operation.

As a particular example, the use of the data values 202 with the initial apportionments 206 and the random errors in their bit copies 208 may be simulated as being used during an accumulation operation. An accumulation operation may be useful, for instance, when estimating the total amount of fuel used by a rocket, missile, or other projectile (where instantaneous fuel usage measurements are accumulated over time to identify total fuel usage). In these or other embodiments, the processing device 302 may generate a number of data values 202 (such as one thousand random data values 202) to be subjected to the accumulation operation or other mathematical operation, and the processing device 302 may randomly or otherwise create errors in various bit copies 208 for these data values 202. The processing device 302 can simulate the accumulation operation or other mathematical operation with the data values 202, including the data values 202 with the errors, in order to identify the cumulative numerical errors associated with the mathematical operation.

Since different apportionments 206 have different numbers of bit copies 208 for at least some of the data bits 204 of the data values 202, the errors in the bit copies 208 can affect the results of the mathematical operation differently. Because of the voting scheme used with redundant bit copies 208, some errors in the bit copies 208 may be voted out and may not be passed to the mathematical operation, while other errors in the bit copies 208 may not be voted out and may be passed to the mathematical operation. The processing device 302 may therefore use an error function to estimate the cumulative numerical error for each apportionment 206. In some cases, the error function may be tailored to the specific mathematical operation to be performed. As an example, the processing device 302 may determine the cumulative numerical error e for each initial apportionment 206 used during an accumulation operation as follows:

$$e = \frac{\sum_{i=1}^{N} |v_i - \tilde{v}_i|}{\sum_{i=1}^{N} v_i}$$

Here, $v_i$ represents an original data value 202, $\tilde{v}_i$ represents a perturbed data value (meaning the original data value 202 as modified due to one or more errors in its bit copies 208 that propagate through the voting to the accumulation operation), and N represents the total number of data values 202. The error function here is based on the fact that the mathematical operation is an accumulation operation, allowing the error function to be tailored to the mathematical operation. Other error functions may be tailored to other types of mathematical operations. By using an error measure that is tailored to the specific mathematical operation to be performed, the processing device 302 can estimate initial cumulative numerical errors for different initial apportionments 206 when those apportionments 206 are used with the specific mathematical operation.

Note that the processing device 302 can use any suitable approach for generating errors in the data values 202 used during the simulations. For example, in some embodiments, the processing device 302 may support one or more error injection approaches. Example error injection approaches include (i) the introduction of single-bit errors applied independently to the bit copies 208 for each data bit 204 (such as with a uniform probability) and/or (ii) the introduction of multi-bit errors (such as two-bit errors) to the collection of bit copies 208 for each data bit 204. The multi-bit errors used here may include all permutations of the multi-bit errors, such as all combinations of bit copies 208 that may suffer from two-bit errors. With this approach, any data value 202 to be processed by the mathematical operation may have a probability of suffering from any number of bit errors (from zero to n, where n is the total number of data bits 204 in the data value 202). Note that the distribution or frequency of the errors can vary based on various factors, such as the expected radiation in the intended application or the design of the satellite 102 or other device or system to be used in the intended application (like whether the device or system has a radiation-hardened memory). However, any other suitable approaches for generating errors in data values 202 may be used during the simulations here.

The more successful apportionments are bred with one another to generate derived apportionments using a genetic algorithm at step 406. This may include, for example, the processing device 302 executing the genetic algorithm to combine one or more portions of one apportionment 206 and one or more portions of another apportionment 206 to generate a new apportionment 206 (a derived apportionment). Each derived apportionment 206 may similarly identify up to a maximum number of bit copies 208 to be used for all data bits 204 of data values 202. The processing device 302 may also introduce one or more random or other changes or "mutations" to one or more of the entries in the derived apportionment 206, which alters the number of bit copies 208 to be used for at least one of the data bits 204. A genetic algorithm is a type of optimization routine that mimics biological genetics processes. Values of parameters representing a proposed solution to a problem (such as the entries of an apportionment 206) are thought of as the genetic code of an "organism." An original population of these organisms, such as the initial apportionments 206 obtained above, are evaluated relative to a fitness function (such as the cumulative numerical error). Better performing organisms (apportionments 206) are used to create a new population, namely the derived apportionments 206, via breeding.

Figure 5:
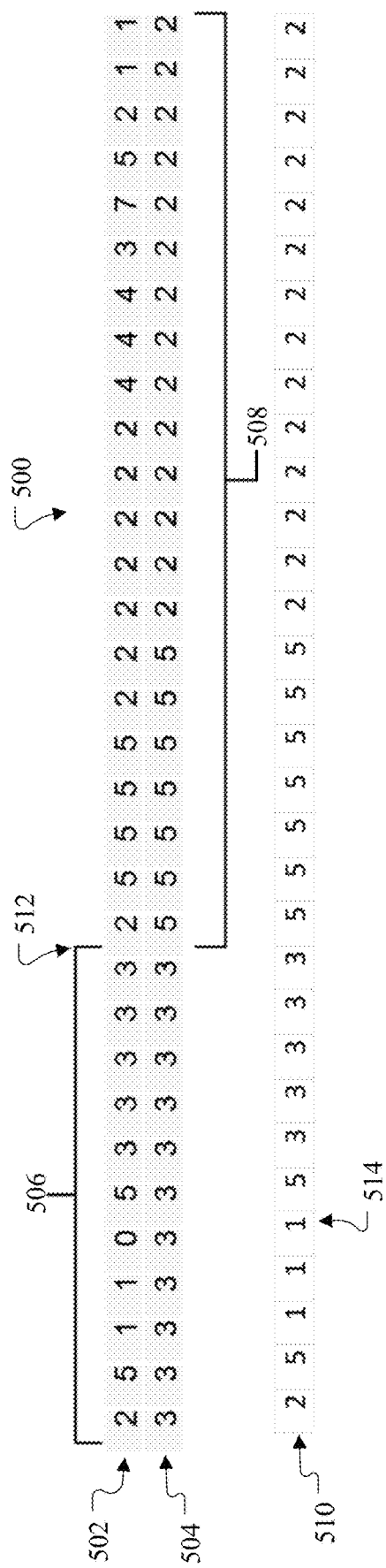
FIG. 5 illustrates an example operation of a breeding function of a genetic algorithm during identification of optimal bit apportionments for digital functions subject to soft errors according to this disclosure.

FIG. 5 illustrates an example operation 500 of a breeding function of a genetic algorithm during identification of optimal bit apportionments for digital functions subject to soft errors according to this disclosure. The breeding function here represents part of the genetic algorithm that combines selected apportionments to create new apportionments. In this example, two initial apportionments 502 and 504 may be identified as being better performing in terms of cumulative numerical error when used in a satellite 102 or other device or system. Here, each apportionment 502 and 504 is represented as a string of integers, where each integer identifies the number of bit copies 208 to be used for a corresponding data bit 204 of a data value 202. For example, the apportionment 502 indicates that the first data bit 204 has two bit copies 208, the second data bit 204 has five bit copies 208, and so on. The apportionment 504 indicates that the first data bit 204 has three bit copies 208, the second data bit 204 has three bit copies 208, and so on. These apportionments 502, 504 may be said to represent part of a first "generation" of apportionments used by the genetic algorithm.

The genetic algorithm combines at least one portion 506 of the apportionment 502 and at least one portion 508 of the apportionment 504 to produce a new derived apportionment 510, which may be said to represent part of another "generation" of the apportionments. In this example, the genetic algorithm identifies a random or other cut point 512, and the genetic algorithm combines the front portion of the apportionment 502 (the entries before the cut point 512) and the back portion of the apportionment 504 (the entries after the cut point 512) to produce the derived apportionment 510. Here, the combination of the apportionments 502, 504 to form the apportionment 510 may be referred to a "binary asexual" reproduction since each integer in the derived apportionment 510 (except for any mutated entries 514 discussed below) represents an integer from one of the apportionments 502, 504. Note that different cut points 512 may be used to produce different derived apportionments 510. Also note that techniques other than using cut points 512 may be used to generate derived apportionments 510.

The genetic algorithm can also change one or more entries 514 in the derived apportionment 510 randomly or some other manner, which represents a mutation in the derived apportionment 510. In some embodiments, each mutation may involve at least one entry 514 that is selected randomly or in some other manner, as well as a random or other change (such as an increment or decrement) to each selected entry 514. As a particular example, some embodiments may introduce a low probability threshold and use a computationally-derived pseudo-random number to determine independently which entries are selected for mutation. It should be noted here that each entry in the apportionments 502, 504, 510 may be limited to a specific range of values. For example, in some cases, each entry in the apportionments 502, 504, 510 may go as low as zero (indicating that no bit copies 208 of the corresponding data bit 204 are used in a particular application), one, or some other threshold. Entries below the lower threshold may not be permitted, which can limit how some mutations of the entries 514 occur. Similarly, in some cases, each entry in the apportionments 502, 504, 510 may go as high as five or some other upper threshold. Entries above the upper threshold may not be permitted, which again can limit how some mutations of the entries 514 occur. Note that different derived apportionments 510 may be produced using different mutations of the same or different entries 514 in the derived apportionments 510.

Simulations are performed to estimate error rates that might be obtained when using the derived apportionments in the given application and to identify the cumulative numerical errors induced by the simulated error rates at step 408. This may include, for example, the processing device 302 performing the same simulations (possibly with the same data values 202) as performed in step 404. This means that the derived apportionments may be tested (i) using the same data values 202 as the initial apportionments 206 and (ii) using the same errors introduced into the bit copies 208 of the data values 202. Ideally, at least some of the derived apportionments tested here perform better (achieve lower cumulative numerical errors) than the initial apportionments tested in step 404.

A determination is made whether to perform another iteration at step 410. This may include, for example, the processing device 302 determining whether any derived apportionments obtained a cumulative numerical error below a threshold value. This may also include the processing device 302 determining if a maximum number of iterations have occurred or if a specified amount of processing time has elapsed. This may further include the processing device 302 determining that the population of trial apportionments has converged to a single solution. Of course, the determination here may be based on any other or additional criteria. If another iteration is to be performed, the process returns to step 406 to breed and test another generation of derived apportionments. Ideally, after a number of generations, the derived apportionments that are produced will be higher performing, which in this case means they provide better (lower) cumulative numerical errors than the initial apportionments.

If another iteration is not performed, one of the derived apportionments can be selected at step 412, and the selected apportionment can be used in a satellite or other device or system at step 414. This may include, for example, the processing device 302 identifying the derived apportionment with the lowest cumulative numerical error, the derived apportionment with a cumulative numerical error below a threshold and having the lowest resource usage, or some other derived apportionment. This may also include programming the satellite 102 or other device or system to use the selected derived apportionment when storing data.

Although FIG. 4 illustrates one example of a method 400 for identifying optimal bit apportionments for digital functions subject to soft errors, various changes may be made to FIG. 4. For example, while shown as a series of steps, various steps in FIG. 4 may overlap, occur in parallel, occur in a different order, or occur any number of times. Although FIG. 5 illustrates one example of an operation 500 of a breeding function of a genetic algorithm during identification of optimal bit apportionments for digital functions subject to soft errors, various changes may be made to FIG. 5. For instance, two apportionments 502, 504 may be bred or otherwise combined in any other suitable manner. Also, portions of more than two apportionments may be combined to produce a derived apportionment.

Figure 6:
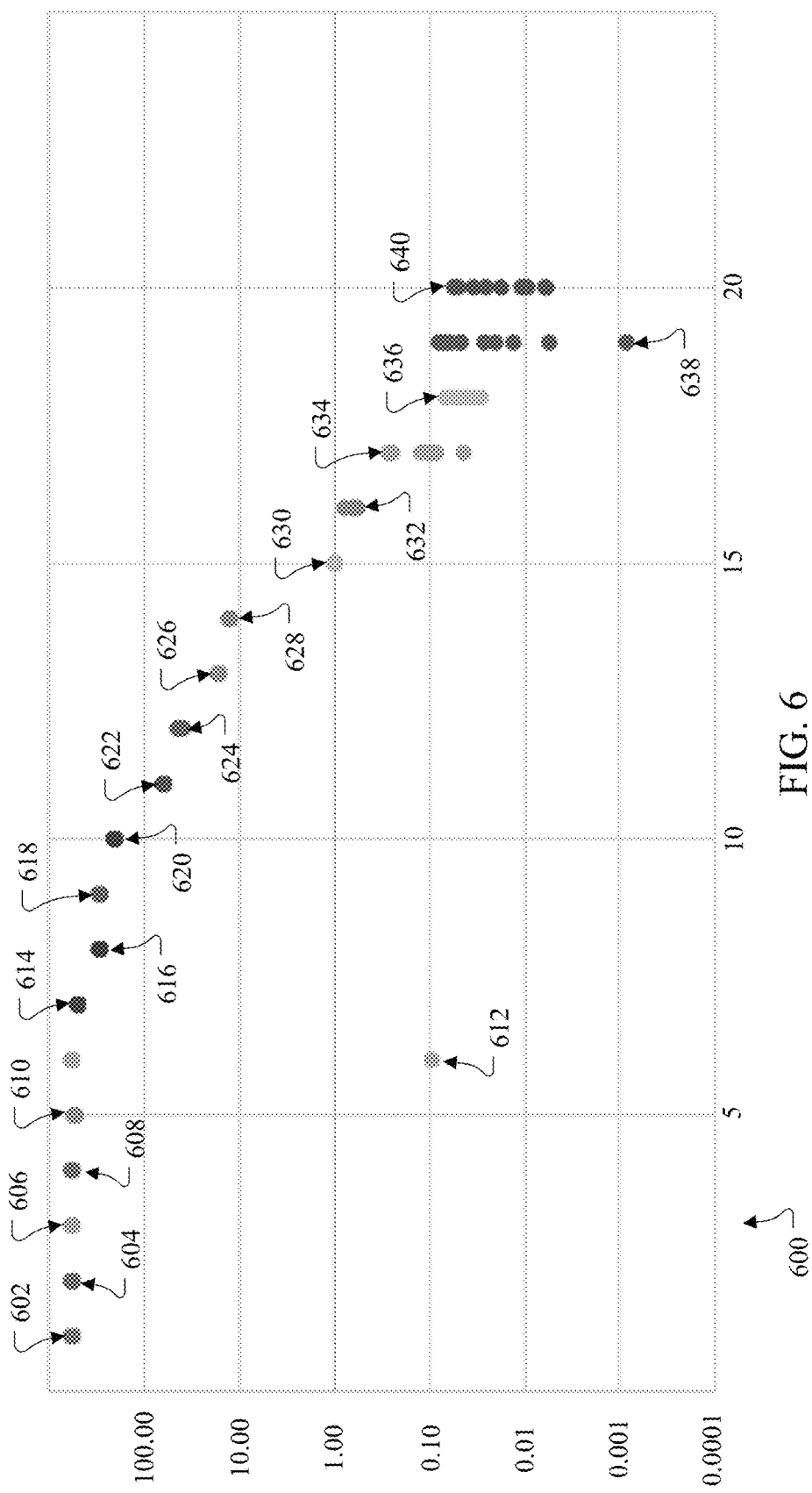
FIG. 6 illustrates example results of a genetic algorithm used during identification of optimal bit apportionments for digital functions subject to soft errors according to this disclosure.

FIG. 6 illustrates example results of a genetic algorithm used during identification of optimal bit apportionments for digital functions subject to soft errors according to this disclosure. In particular, FIG. 6 illustrates an example graph 600 with different apportionments (plotted along the horizontal axis) and their resulting cumulative numerical errors in the form of mean accumulated error (plotted along the vertical axis) determined during simulations as discussed above.

In this example, columns 602-640 represent the mean accumulated errors associated with twenty different example apportionments. The apportionments are defined as follows in string format, where each integer identifies a number of bit copies 208 to be used for the correspond data bit 204.

Column 602: 44444444444445555222222222222000
Column 604: 44444444444445554232222212110110
Column 606: 44444444444445553332222221111100
Column 608: 44444444444455552222222222221000
Column 610: 44445555553333333333333311111111
Column 612: 44444444444444442222222222222222
Column 614: 44544445545454444322222222220000
Column 616: 55555333333333333333333333300000
Column 618: 55555555555555555111111100000000
Column 620: 54544544456745121242111211211111
Column 622: 56644455671444423225311110112020
Column 624: 50946640080440435412101212623351
Column 626: 55555333333333333333333333311111
Column 628: 55555445545444552222311321111000
Column 630: 00000000000000000000000000000000
Column 632: 33333333333333333333333333333333 (standard TMR)
Column 634: 55555555553333333333331111111111
Column 636: 55555565555553554111111111111100
Column 638: 07960755555555551111111110210100
Column 640: 55555555555555551111111111110000

The various apportionments shown above may be generated during operation of the genetic algorithm as described above. As can be seen here, most of the apportionments have worse accumulated errors compared to the standard TMR approach (shown in column 632). However, four of the apportionments associated with columns 634-640 as defined above can achieve improved accumulated errors compared to the standard TMR approach. As a result, any of these apportionments may be selected and implemented in a satellite 102 or other device or system. Also, since the total number of bit copies 208 defined by each of these four apportionments does not exceed three times the number of bits 204, any of these four apportionments may be implemented using the same or similar memory resources as the standard TMR approach.

Note that the apportionments defined above and represented in FIG. 6 may represent only some of the apportionments that are generated by the genetic algorithm and that are analyzed via simulations using the various approaches described above. Also note that the apportionments defined above and represented in FIG. 6 relate to specific results for a specific implementation, such as an implementation in which an accumulation operation will be performed in a given environment by specific hardware. The actual apportionment that is selected for any specific implementation can vary based on a number of factors, including the hardware to be used and the environment in which the hardware will be used.

Although FIG. 6 illustrates examples of results of a genetic algorithm used during identification of optimal bit apportionments for digital functions subject to soft errors, various changes may be made to FIG. 6. For example, the results shown in FIG. 6 are merely meant to illustrate one example of the type of results that may be obtained using the approaches described above.

Figure 7:
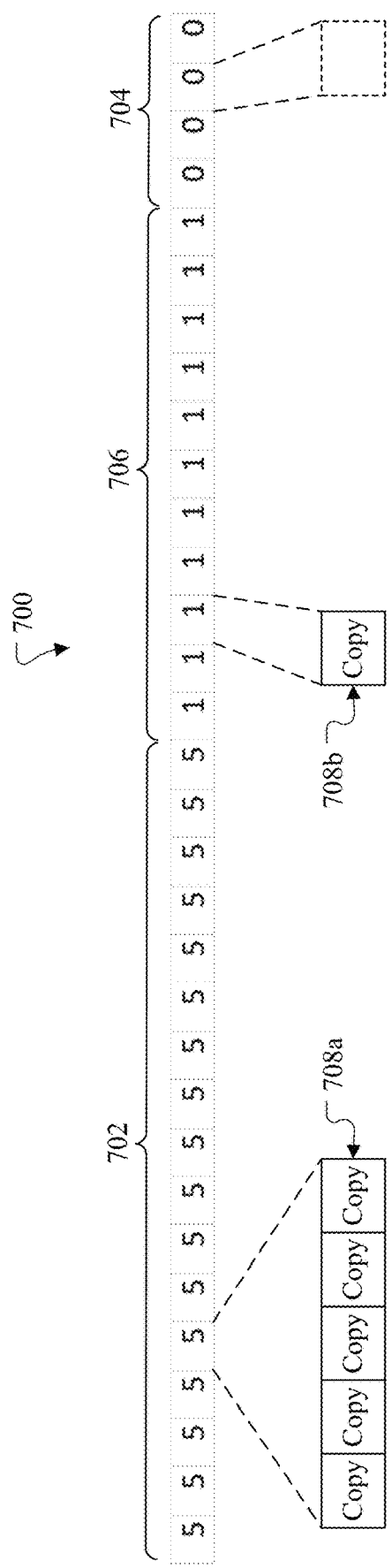
FIG. 7 illustrates an example optimal bit apportionment for a digital function subject to soft errors according to this disclosure.

FIG. 7 illustrates an example optimal bit apportionment 700 for a digital function subject to soft errors according to this disclosure. The optimal bit apportionment 700 here may, for example, be generated using the simulations and genetic algorithm described above. In this example, the optimal bit apportionment 700 includes a first subset 702 containing a collection of the most significant bits of a data value, a second subset 704 containing a collection of the least significant bits of the data value, and a third subset 706 containing a collection of bits between the most and least significant bits of the data value. Note that the number of bits in each subset 702-706 of the apportionment 700 can vary depending on the specifics of the intended application. Thus, while the first subset 702 contains seventeen bits, the second subset 704 contains four bits, and the third subset 706 contains eleven bits here, other numbers of bits may appear in each subset 702-706.

The apportionment 700 here indicates that five bit copies 708a should be used for each bit in the first subset 702, one bit copy 708b should be used for each bit in the third subset 706, and no bit copies should be used for each bit in the second subset 704. In this type of arrangement, it may be determined that a 100% error in the four least significant bits of data values 202 can be acceptable, meaning this amount of error in the four least significant bits of the data values 202 still allows an adequate cumulative numerical error to be obtained overall. Moreover, in this type of arrangement, a premium is placed on maintaining the integrity of the most significant bits of the data values 202. As a result, each of the most significant bits of the data values 202 can have a larger number of redundant copies. The middle bits of the data values 202 are important but less so compared to the most significant bits, so each of those bits of the data values 202 can include a smaller number of redundant copies or a single copy as is the case in FIG. 7.

Note that the total number of bit copies here still totals ninety-six, which means that this apportionment 700 can be implemented in the same memory space as the standard TMR approach. However, the results obtained using the apportionment 700 shown here may surpass the results obtained using the standard TMR approach by a significant margin. In noisy or other high-error environments, for instance, simulations may show that the apportionment 700 far outperforms the standard TMR approach.

Although FIG. 7 illustrates one example of an optimal bit apportionment 700 for a digital function subject to soft errors, various changes may be made to FIG. 7. For example, the apportionment 700 may include more than three sections, and each section may be associated with any suitable number of bits (including a single bit) and identify any suitable number of bit copies. Also, while FIG. 7 assumes that the apportionment 700 is used with 32-bit data values, other apportionments may be identified and used for data values of other lengths.

Figure 8:
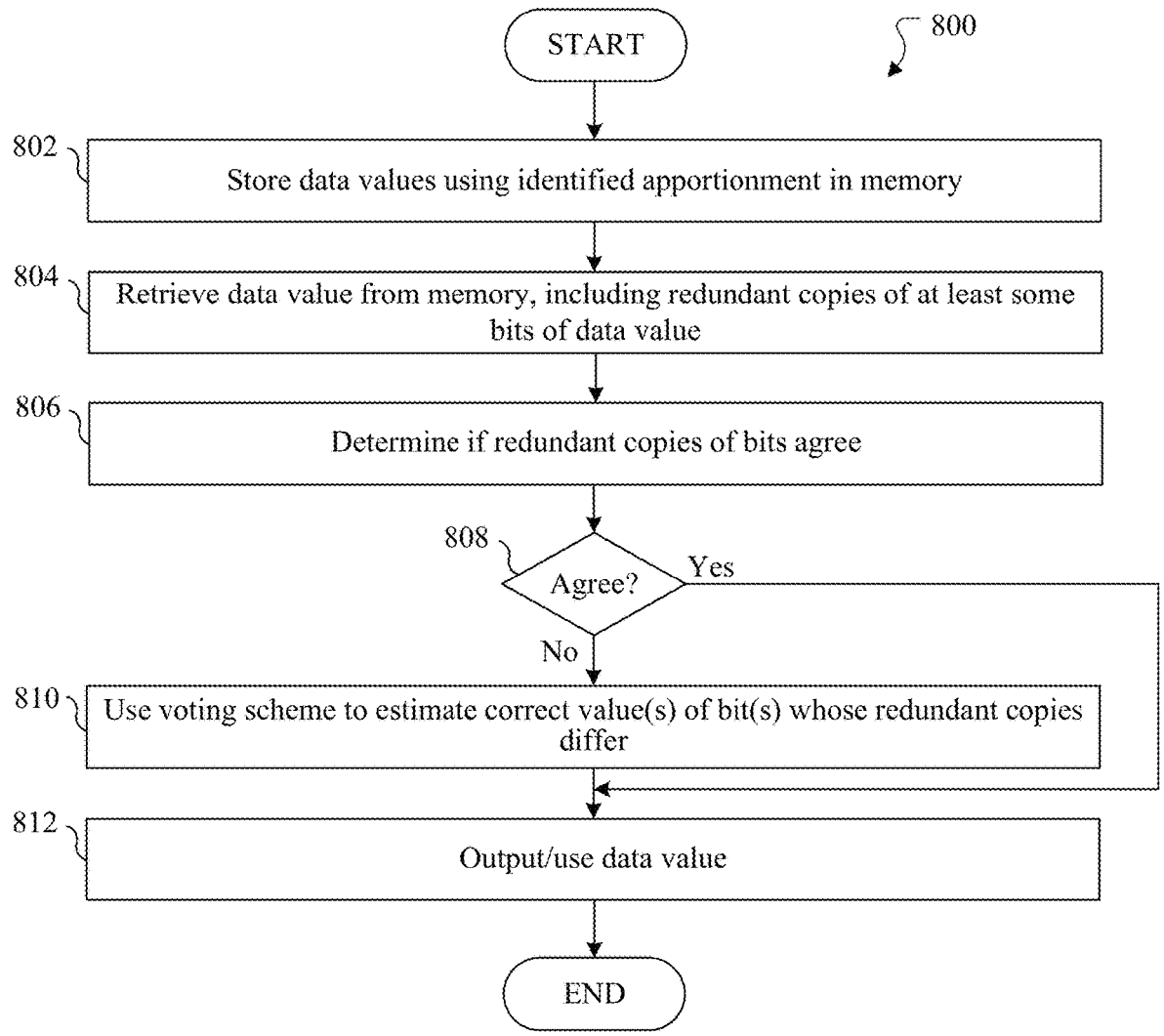
FIG. 8 illustrates an example method for using an optimal bit apportionment for a digital function subject to soft errors according to this disclosure.

FIG. 8 illustrates an example method 800 for using an optimal bit apportionment for a digital function subject to soft errors according to this disclosure. For ease of explanation, the method 800 may be described as being performed by the satellite 102 of FIG. 1A or other device or system that includes at least the processing device(s) 302 and storage device(s) 304 of FIG. 3. However, the method 800 may be performed using any other suitable device and in any other suitable system. Another example implementation may, for instance, involve direct implementation of voting logic and value estimation in programmable logic of an FPGA.

As shown in FIG. 8, data values are stored in at least one memory using an identified apportionment at step 802. This may include, for example, the processing device 302 storing one or more data values 202 in at least one storage device 304 using an identified apportionment 206. The identified apportionment 206 here may represent an apportionment determined using the simulations and the genetic algorithm discussed above. As a result, the processing device 302 may store different numbers of bit copies 208 for different bits 204 of each data value 202. Note that the at least one storage device 304 here may or may not include multiple types of memory, such as a radiation-hardened memory 210 and a non-radiation-hardened memory 212.

A data value, including redundant bit copies for at least some bits of the data value, is retrieved from the memory at step 804. This may include, for example, the processing device 302 retrieving all of the bit copies 208 for the bits 204 of the data value 202 from the at least one storage device 304. A determination is made whether all redundant copies of each bit having multiple bit copies agree or match one another at step 806. This may include, for example, the processing device 302 determining whether all bit copies 208 associated with a single bit 204 have the same value. If there is agreement between the redundant copies of the bits at step 808, the data value can be output or used in some manner at step 812.

If there is not agreement between the redundant copies of at least one of the bits at step 808, a voting scheme is used to estimate the correct value of each bit whose redundant copies disagree or differ at step 810. This may include, for example, the processing device 302 using any suitable technique to determine the value of a bit 204 based on multiple redundant copies 208 of the bit 204 that differ. For example, various voting approaches have been developed and used with the TMR approach, and the same or similar voting approaches may be used here. As a particular example, if there are multiple copies of the same bit and at least two of the copies differ, the voting scheme may rely on a "majority rule" approach where the "one" or "zero" values appearing more often in the bit copies are used as the value for that bit. If the numbers of "one" and "zero" values in the bit copies are equal, the voting scheme may default to a value of "one" or default to a value of "zero" depending on the implementation. As another example, a bit copy 208 stored in a radiation-hardened memory 210 may be given more weight than one or more bit copies 208 stored in a non-radiation-hardened memory 212, or a bit copy 208 stored in a radiation-hardened memory 210 may be used as a tiebreaker. Of course, other voting approaches may also be used here. The data value (with one or more bits determined using the voting scheme) can be output or used in some manner at step 812.

Although FIG. 8 illustrates one example of a method 800 for using an optimal bit apportionment for a digital function subject to soft errors, various steps in FIG. 8 may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
identifying multiple apportionments, each apportionment identifying numbers of bit copies to be stored in at least one memory for at least some bits of a data value;
for each of the apportionments, estimating a numerical error associated with use of the apportionment with a specified function, the numerical error estimated by creating errors in bit copies of multiple data values processed using the specified function;
combining portions of different ones of the apportionments having lower estimated numerical errors to create multiple derived apportionments;
for each of the derived apportionments, estimating a numerical error associated with use of the derived apportionment with the specified function; and
selecting a final apportionment for use with the specified function, the final apportionment comprising or based on at least one of the derived apportionments.

2. The method of claim 1, wherein combining the portions of the different ones of the apportionments having the lower estimated numerical errors to create the derived apportionments comprises:
altering one or more entries in at least one of the derived apportionments to create one or more mutations in the at least one of the derived apportionments.

3. The method of claim 1, further comprising:
using a genetic algorithm to repeatedly generate new derived apportionments based on prior derived apportionments;
wherein the final apportionment represents one of the derived apportionments generated using the genetic algorithm.

4. The method of claim 1, wherein the specified function represents a function to be performed in a specified environment where radiation causes errors in stored information.

5. The method of claim 1, wherein the errors created in the bit copies of the multiple data values processed using the specified function comprise:
one-bit errors introduced into individual ones of the bit copies of the multiple data values; and
permutations of multi-bit errors introduced into the bit copies of the multiple data values.

6. The method of claim 1, wherein the numerical errors of the derived apportionments are determined using the multiple data values and the errors created in the bit copies of the multiple data values.

7. The method of claim 1, wherein:
the at least one memory comprises a radiation-hardened memory and a non-radiation-hardened memory; and
use of one and both of the radiation-hardened memory and the non-radiation-hardened memory is simulated during determination of the numerical errors.

8. The method of claim 1, wherein the specified function comprises an accumulation operation.

9. An apparatus comprising:
at least one processing device configured to:
identify multiple apportionments, each apportionment identifying numbers of bit copies to be stored in at least one memory for at least some bits of a data value;
for each of the apportionments, estimate a numerical error associated with use of the apportionment with a specified function, the numerical error based on errors created in bit copies of multiple data values processed using the specified function;
combine portions of different ones of the apportionments having lower estimated numerical errors to create multiple derived apportionments;
for each of the derived apportionments, estimate a numerical error associated with use of the derived apportionment with the specified function; and
select a final apportionment for use with the specified function, the final apportionment comprising or based on at least one of the derived apportionments.

10. The apparatus of claim 9, wherein, to combine the portions of the different ones of the apportionments having the lower estimated numerical errors to create the derived apportionments, the at least one processing device is configured to alter one or more entries in at least one of the derived apportionments to create one or more mutations in the at least one of the derived apportionments.

11. The apparatus of claim 9, wherein:
the at least one processing device is further configured to use a genetic algorithm to repeatedly generate new derived apportionments based on prior derived apportionments; and
the final apportionment represents one of the derived apportionments generated using the genetic algorithm.

12. The apparatus of claim 9, wherein the specified function represents a function to be performed in a specified environment where radiation causes errors in stored information.

13. The apparatus of claim 9, wherein the errors created in the bit copies of the multiple data values processed using the specified function comprise:
one-bit errors introduced into individual ones of the bit copies of the multiple data values; and
permutations of multi-bit errors introduced into the bit copies of the multiple data values.

14. The apparatus of claim 9, wherein the at least one processing device is configured to determine the numerical errors of the derived apportionments using the multiple data values and the errors created in the bit copies of the multiple data values.

15. The apparatus of claim 9, wherein:
the at least one memory comprises a radiation-hardened memory and a non-radiation-hardened memory; and
the at least one processing device is configured to simulate use of one and both of the radiation-hardened memory and the non-radiation-hardened memory during determination of the numerical errors.

16. A non-transitory computer readable medium containing instructions that when executed cause at least one processor to:
identify multiple apportionments, each apportionment identifying numbers of bit copies to be stored in at least one memory for at least some bits of a data value;
for each of the apportionments, estimate a numerical error associated with use of the apportionment with a specified function, the numerical error based on errors created in bit copies of multiple data values processed using the specified function;
combine portions of different ones of the apportionments having lower estimated numerical errors to create multiple derived apportionments;
for each of the derived apportionments, estimate a numerical error associated with use of the derived apportionment with the specified function; and select a final apportionment for use with the specified function, the final apportionment comprising or based on at least one of the derived apportionments.

17. The non-transitory computer readable medium of claim 16, wherein the instructions that when executed cause the at least one processor to combine the portions of the different ones of the apportionments having the lower estimated numerical errors to create the derived apportionments comprise:

instructions that when executed cause the at least one processor to alter one or more entries in at least one of the derived apportionments to create one or more mutations in the at least one of the derived apportionments.

18. The non-transitory computer readable medium of claim 16, wherein:

the instructions when executed further cause the at least one processor to use a genetic algorithm to repeatedly generate new derived apportionments based on prior derived apportionments; and the final apportionment represents one of the derived apportionments generated using the genetic algorithm.

19. The non-transitory computer readable medium of claim 16, wherein the errors created in the bit copies of the multiple data values processed using the specified function comprise:

one-bit errors introduced into individual ones of the bit copies of the multiple data values; and permutations of multi-bit errors introduced into the bit copies of the multiple data values.

20. The non-transitory computer readable medium of claim 16, wherein:

the at least one memory comprises a radiation-hardened memory and a non-radiation-hardened memory; and the instructions when executed cause the at least one processor to simulate use of one and both of the radiation-hardened memory and the non-radiation-hardened memory during determination of the numerical errors.

* * * * *